May 26, 1959  E. NASSOUR ET AL  2,887,938
CAMERA
Filed Sept. 24, 1956  2 Sheets-Sheet 1
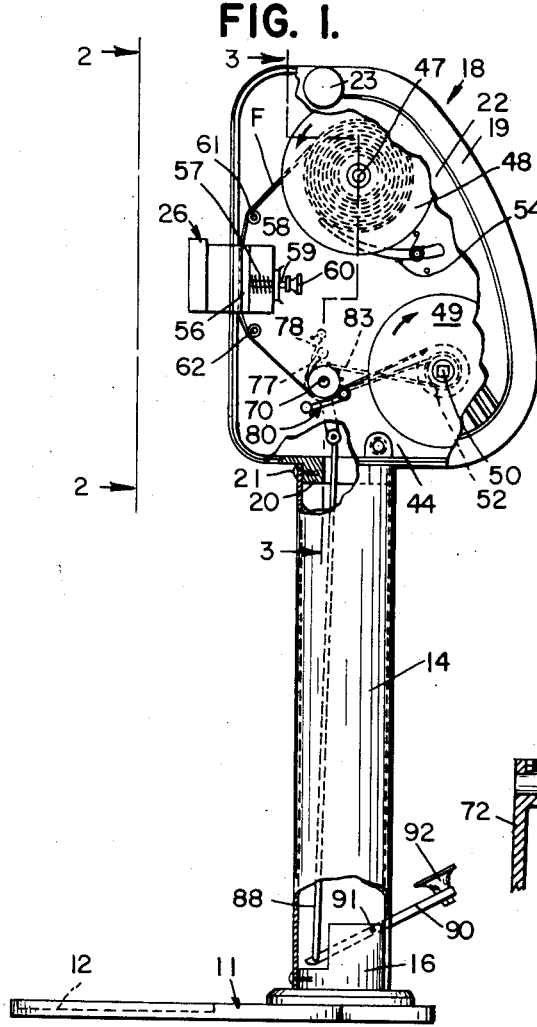
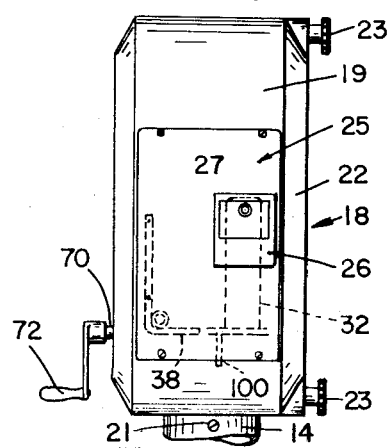
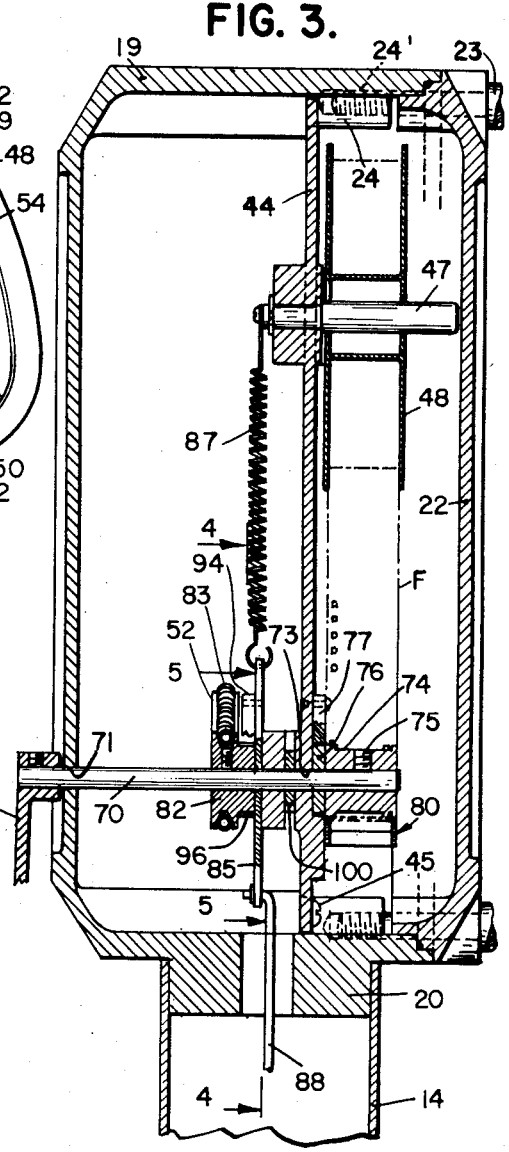
INVENTORS
EDWARD NASSOUR
CARL F. JOERS
BY
*Mason & Graham*
ATTORNEYS May 26, 1959　　　　E. NASSOUR ET AL　　　　2,887,938
CAMERA
Filed Sept. 24, 1956　　　　　　　　　　　　2 Sheets-Sheet 2
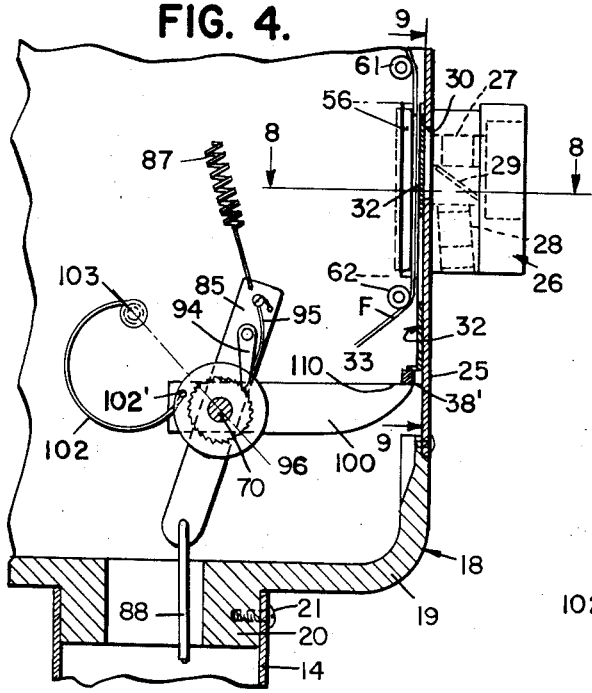
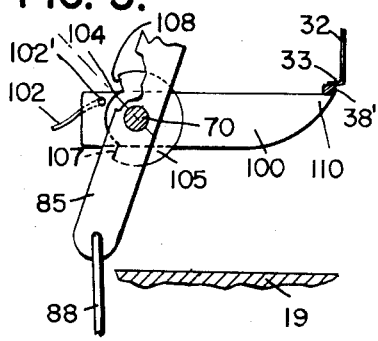
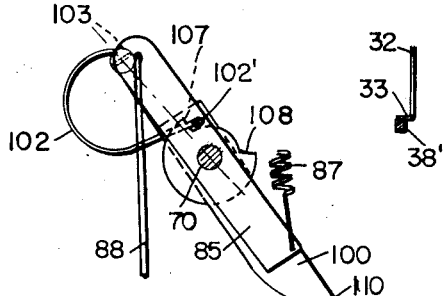
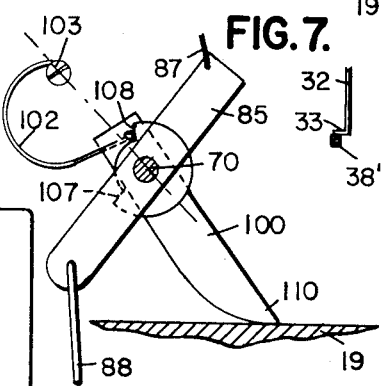
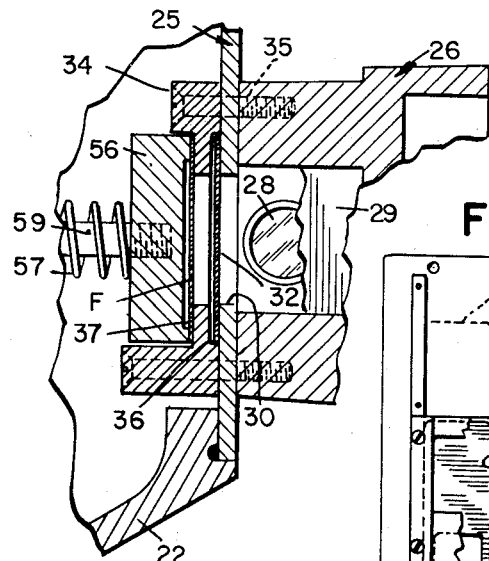
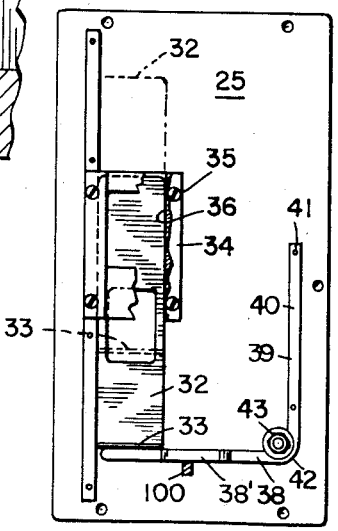
INVENTORS
EDWARD NASSOUR
CARL F. JOERS
BY
Mason & Graham
ATTORNEYS

United States Patent Office 2,887,938
Patented May 26, 1959

2,887,938

CAMERA

Edward Nassour, Los Angeles, and Carl F. Joers, Hollywood, Calif., assignors to Nassour Studios, Inc., Los Angeles, Calif., a corporation of California Application September 24, 1956, Serial No. 611,602

8 Claims. (Cl. 95—53)

This invention has to do generally with cameras and more particularly with the type of camera designed to photograph simultaneously objects located in two different fields.

In recent years with the widespread use of bank checks for payment of employes and other purposes there has been an increased tendency for persons to cash checks at places other than a bank where they are known, and in many areas the cashing of checks has become a business in itself. In order to identify a person representing a check for payment with the particular check presented there has been some use made of special cameras designed to take a photograph of the person and the check together. So far as we know, such cameras have been costly, complicated, subject to damage if not carefully handled, or possessed other disadvantages.

An object of this invention, therefore, is to provide a novel and improved camera of the type designed to photograph simultaneously a person before the camera and a check or other document on a surface below the lens of the camera which does not have the above-noted disadvantages of prior cameras of this type.

Another object is to provide a camera of the type indicated of simple construction which can be manufactured inexpensively. Still another object is to provide such a camera which is extremely easy to operate and which will withstand considerable abuse.

A further object is to provide a camera of the type indicated having a novel shutter and shutter-operating mechanism. In this connection it is an object to provide a free, vertically movable shutter which is impelled upwardly by transfer of momentum from a hammer through an intervening body and allowed to return to its original position by gravity.

A further object of the invention is to provide a camera of the type indicated in which most of the parts are carried upon a single removable partition wall in the camera casing.

Another object is to provide a camera in which the lens and shutter are mounted upon a plate which forms part of the housing and can be readily removed for making adjustments to the lens and for exposing certain of the main working parts.

These and other objects will be apparent from the drawings and the following description. Referring to the drawings:

Fig. 1 is a side elevational view, partially broken away, showing a camera embodying the invention;

Fig. 2 is a fragmentary front elevational view on line 2—2 of Fig. 1;

Fig. 3 is an enlarged fragmentary sectional view on line 3—3 of Fig. 1;

Fig. 4 is a sectional view on line 4—4 of Fig. 3;

Figs. 5, 6 and 7 are fragmentary sectional views on line 5—5 of Fig. 3 showing different positions of the parts;

Fig. 8 is an enlarged sectional view on line 8—8 of Fig. 4; and

Fig. 9 is an enlarged view in the plane of line 9—9 of Fig. 4.

More particularly describing the invention, the camera includes a base designated 11, having a recessed surface 12 in its upper surface to accommodate a document to be photographed, such as a bank check. Mounted on the base is an upright column or tubular standard 14 which fits over and is attached to a cylindrical stud 16 on the base. Carried at the upper end of the column 14 is a camera head designated generally by 18 which includes a casing 19. The latter is attached to the upper end of the column 14 by depending tubular projection 20 and one or more screws 21.

The casing 19 includes a removable side plate, fragmentarily shown in Fig. 1 and designated 22. This is secured by means of thumb screws 23 which thread into threaded bores 24 in bosses 24' of the casing.

The casing includes a lens mounting plate 25 which carries a lens assembly 26 which may consist of an upper lens 27 and a lower lens 28. As previously indicated, the camera is designed to simultaneously photograph two different fields and thus the lens 27 is directed to photograph a person or object directly in front of the camera while lens 28 is directed to photograph a document upon the recessed surface 12 of the base. A mirror 29 is shown associated with the lens 28 for the purpose of reflecting the light rays through an aperture 30 in the lens mounting plate onto film F.

The lens mounting plate also carries a shutter 32 which may be simply an apertured strip of metal having a flanged lower end 33. A suitable apertured shutter and film guide 34 mounted on the rear of plate 25 by screws 35 provides a guideway 36 for the shutter and surface 37 for the film F.

The shutter rests upon the end portion of a free arm 38 of an L-shaped shutter support member 39 having a vertically disposed section 40. The latter is secured to the lens mounting plate 25 in any suitable manner as by rivets 41 and is joined to arm 38 by a curved section 42 which is secured to plate 25 by a screw nut and washer assembly 43. As will later be described, the shutter is impelled upward by a hammer 100 striking the arm 38 at a bowed-out section 38' thereof.

The housing includes a removably mounted partition wall 44 which may be secured by means of screws 45. The main components of the camera, apart from the lens and shutter, are mounted upon this wall. Near the upper end of the wall is a spool-supporting spindle 47 which is used to rotatably mount the spool 48 containing the film to be exposed. A film take-up reel 49 is shown mounted upon a driven spindle 50 which carries a sheave 52 fixed thereto on the far side of the partition wall 44 (shown in broken lines in Fig. 1). The partition wall carries a spring-biased film counter or register lever 54 which rides against the film in the spool 48 and may be connected to any suitable mechanism (not shown) for giving a visible indication of the amount of film used or remaining.

Immediately behind the film and shutter guide 34 is mounted a film pressure pad 56. This is biased toward the film guide by a spring 57 between the plate and a bracket 58 on the partition wall 44, a rod 59 extending through a hole in the bracket and being provided with a handle 60.

The partition wall also carries a pair of film guide pins 61 and 62 which may be fitted with rotatable sleeves, if desired. For the purpose of advancing the film and operating the shutter we provide a shaft 70 journaled in an opening 71 in the casing and provided with a crank 72 at its outer end. The inner end of the shaft is journaled in the partition wall in bore 73 thereof and beyond this carries a film drive sprocket 74, the latter being fixed to the shaft for rotation therewith as by means of a set screw 75. Fixed to the side of the sprocket is a ratchet wheel 76 which is engaged by a non-reversing pawl 77 mounted on the wall 44 and provided with a suitable spring 78. Immediately below the ratchet wheel is mounted a conventional type of film guide, designated 80, for maintaining the film in engagement with the teeth of the sprocket wheel 74.

The shaft also carries a sheave or pulley 82 which is fixed to the shaft. A belt 83 of the coil spring type extends around this sheave and sheave 52 on the take-up spindle 50.

For the purpose of actuating shaft 70 to advance the film, I provide an actuating lever, designated 85, which rotates relative to the shaft 70. The lever is held in its normal position as shown in Figs. 4 and 5 by means of a tension spring 87 connected to the upper end of the lever and to the inner end of the spindle 47. A rod 88 connects the opposite end of the lever to an operating handle lever 90 which is pivotally mounted at 91 in the portion 16 of the base. The lever 90 is provided with a suitable knob 92 for ease of operation.

Actuating lever 85 carries a pawl 94 urged by a spring 95 into engagement with a ratchet wheel 96 which is integral with or formed on the side of the sheave 82. Thus when the operating lever 90 is depressed at its outer end the actuating lever 85 is partially rotated to turn the shaft 70 through the medium of the ratchet means 94, 96. This of course rotates the film drive sprocket as well as the film take-up spindle thereby advancing the film.

We provide novel means for actuating the shutter. As previously pointed out, the shutter normally rests upon the outer end portion of the free arm section 38 of the member 39. For the purpose of actuating the shutter we cause a hammer designated 100 to strike a blow against the under edge of the arm 38 whereby the force of the blow is transmitted, by transfer of momentum, through arm 38 to the shutter to propel it upwardly to its uppermost position as shown in broken lines in Fig. 9, the shutter being limited in its upward movement by the shutter and film guide and the flange 33 at the lower end of the shutter.

The hammer 100 is rotatably mounted upon shaft 70. An arcuate wire spring 102 is attached at one end to partition wall 34 by screw 103. The other end of the spring extends through an opening in the end of the hammer and projects beyond the hammer into a recess 104 formed in the periphery of a disk 105 which is integral with or fixed to actuating lever 85.

In the operation of the device when the lever 90 is depressed at its outer end the film is advanced in a manner previously described during downward movement of the handle. During such movement of the lever 90, the actuating lever 85 moves from the position of Figs. 4 and 5 to that of Fig. 6. This moves the hammer 100 to the position of Fig. 6 as the end 102′ of spring 102 is carried past center with respect to a line extending between its anchor point 103 and the shaft 70 by shoulder 107 of recess 104. The hammer remains in this position during the return movement of the lever 90 and other parts to their original position until lever 85 reaches a position slightly between that in which it is shown in Fig. 7 and its normal position of Fig. 6. When the end 102′ of the spring is carried back over center by the return movement of the lever 85 and disk 105 wherein shoulder 108 thereof engages the end of the spring, the spring snaps away from shoulder 108 toward shoulder 107 in the recess thereby throwing the outer end portion 110 of hammer 100 into forceful striking engagement with the under surface of the arm 38. The force of the hammer is transferred through arm 38 to the shutter 32 which is thereby propelled upward, exposing the film. The upward movement of the shutter is limited by its lower flanged end 33 striking the lower end of the shutter and film guide member 34. The shutter returns by gravity.

While we have shown and described a preferred form of our invention, we contemplate that various changes and modifications can be made therein without departing from the invention, the scope of which is indicated by the following claims.

We claim:

1. In a camera, a housing providing an aperture, a shutter mounted for free limited vertical edgewise movement across said aperture, a momentum-transfer member, said shutter normally resting upon said member in position to close said aperture, a hammer for striking said member on a side thereof opposite to that side on which said shutter rests whereby to cause said shutter to be impelled upwardly, and means for operating said hammer.

2. A construction as set forth in claim 1 in which said momentum-transfer member comprises a bar having a mounted portion and having a free end portion, said shutter resting on said free end portion.

3. A construction as set forth in claim 1 in which said momentum-transfer member comprises an L-shaped bar including a vertical portion and a horizontal portion, said horizontal portion being free and lying beneath the lower edge of said shutter and supporting said shutter, said vertical portion being anchored.

4. In a camera, a housing providing an aperture, means on the housing at one side of said aperture providing a vertical guide track, a shutter mounted in said track for free limited vertical movement, a momentum-transfer member mounted on said housing and having a free end portion beneath said shutter, said shutter normally resting upon said free end portion of said momentum-transfer member, a hammer supported in said housing in position to strike the underside of said free end portion of said momentum-transfer member, and means for actuating said hammer.

5. In a camera, a housing providing an aperture, a shutter mounted for free limited vertical edgewise movement across said aperture, a momentum-transfer member, said shutter normally resting upon said member in position to close said aperture, a shaft journaled in said housing, an actuating lever rotatably mounted on said shaft, a unidirectional drive connection between said lever and said shaft, means for reciprocating said lever, a hammer lever rotatably mounted on said shaft, spring means for urging said hammer in a direction to hit the undersurface of said momentum-transfer member, and interengaging means between said hammer lever and said actuating lever for moving said hammer lever away from said momentum-transfer member and subsequently precipitously releasing the same whereby to permit the hammer lever to strike a blow against said momentum-transfer member.

6. A camera as set forth in claim 5 in which said spring means comprises an arcuate spring fixed at one end to said housing and connected at its other end to an end of said hammer lever, and in which the interengaging means between said hammer lever and said actuating lever comprises a disk on said actuating lever having an elongated peripheral recess in which the hammer lever end of said spring is received.

7. In a camera, a casing, said casing including a detachably mounted lens mounting plate, said plate having a picture-taking aperture, a lens assembly mounted on the plate in front of said aperture, shutter guide means on the inner side of said plate providing a vertical guide path, a shutter mounted in said guide means behind said aperture for limited free vertical movement, a momentum-transfer member mounted on said plate and providing a free arm beneath and supporting said shutter at its lower end, a hammer mounted in said housing in position to strike said momentum-transfer member, and means carried by said housing for actuating said hammer.

8. In a camera, a base, a tubular column on the base, a camera housing carried on said column, said housing having an aperture, a shutter mounted for free limited vertical movement, a momentum-transfer bar including a stiff free end portion beneath and supporting said shutter, a shaft journaled in said housing, a spring-biased trip hammer lever rotatably mounted on the shaft adapted to strike the undersurface of said bar, an actuating lever rotatably mounted on said shaft, an operating lever mounted on said base, a rod operatively connecting said operating and actuating levers, a ratchet drive means between said actuating lever and said shaft, and connection means between said actuating lever and said trip hammer lever operable to first retract and subsequently release said trip hammer lever upon movement of said actuating lever.

References Cited in the file of this patent

UNITED STATES PATENTS

| | | |
|---|---|---|
| 1,115,538 | Hochstetter | Nov. 3, 1914 |
| 1,268,577 | Jones | June 4, 1918 |
| 1,645,590 | Ernst | Oct. 18, 1927 |
| 2,182,133 | Moomaw | Dec. 5, 1939 |